C. SCHARDT.
AGRICULTURAL IMPLEMENT.
APPLICATION FILED SEPT. 16, 1908.
916,202.
Patented Mar. 23, 1909.
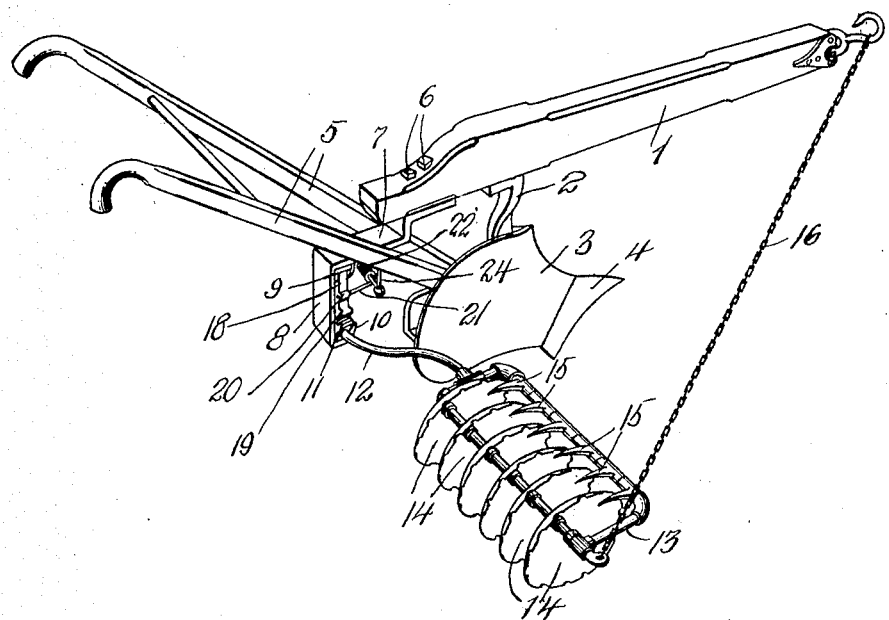
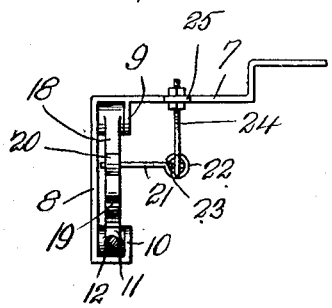
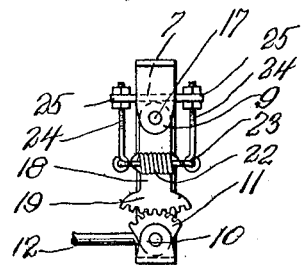

UNITED STATES PATENT OFFICE.

CHRISTIAN SCHARDT, OF BRADDOCK, PENNSYLVANIA.

AGRICULTURAL IMPLEMENT.

No. 916,202.  Specification of Letters Patent.  Patented March 23, 1909.

Application filed September 16, 1908. Serial No. 453,278.

*To all whom it may concern:*

Be it known that I, CHRISTIAN SCHARDT, a citizen of the United States of America, residing at Braddock, in the county of Allegheny and State of Pennsylvania, have invented certain new and useful Improvements in Agricultural Implements, of which the following is a specification, reference being had therein to the accompanying drawing.

This invention relates to agricultural implements, and more particularly to attachments for plows.

The primary object of the invention is to provide a novel cultivator that can be adjustably connected to a plow to simultaneously till the soil and prepare the same for the reception of grain.

Another object of this invention is to provide a simple, inexpensive and durable harrow attachment, that can be easily and quickly connected to a plow to disintegrate the soil thrown up from the furrow made by said plow.

A further object of this invention is to provide a self-adjusting cultivator attachment for plows that can be easily regulated to properly agitate and disintegrate the earth thrown up by a plow.

Referring to the drawings forming a part of this application: Figure 1 is a perspective view of a plow equipped with my attachment, Fig. 2 is a side elevation of the same, partly broken away, and Fig. 3 is a front elevation of the attachment, partly broken away.

In the accompanying drawings, 1 designates a plow beam having a post 2, supporting a mold board 3 and a plow point 4. Connected to the mold board 3 and the post 2 are plow handles 5.

Detachably connected to the under side of the rear end of the beam 1 by bolts 6 is a rearwardly extending frame 7 having a hanger 8 and a depending lug 9 adjacent and parallel to said hanger. Pivotally mounted in the hanger 8 by a pin 10 is the enlarged segment-shaped toothed head 11 of a curved arm 12, said arm supporting a rectangular frame 13. The frame 13 supports a plurality of revoluble toothed harrow disks 14 and a scraper 15 for each disk. This frame together with the arm 12 is constructed of light and durable metal, such as a gas pipe, and in order that the outer end of said frame will be braced when the harrow attachment is in operation, I connect the outer end of said frame to the forward end of the beam 1 by a chain or cable 16.

Pivotally mounted between the hanger 8 and the depending lug 9 by a pin 17 is a lever 18 having the lower end thereof enlarged and toothed, as at 19, to engage the enlarged segment-shaped toothed head 11 of the arm 12. The side edges of this pivoted lever are provided with apertured lugs 20, and extending through said lugs are the parallel rearwardly extending ends 21 of a coil spring 22, said spring being arranged upon a cross bar 23 supported by depending adjustable bolts 24, carried by apertured side lugs 25 of the rearwardly extending frame 7.

In operation, an adjustment of the bolts 24 will position the lever 18 to support the arm 12 and the harrow frame thereof at any desired elevation or inclination with respect to the plow point and mold board. Should any irregularities in the earth thrown up by the plow be encountered by the harrow attachment, said harrow attachment adjusts itself to said irregularities, but upon being relieved immediately assumes its normal position by means of the coil spring 22.

While in the drawings forming a part of this application there is illustrated the preferred embodiments of my invention, I would have it understood that the elements therein can be varied or changed as to shape, proportion and manner of assemblage without departing from the spirit of the invention.

Having now described my invention what I claim as new, is:—

1. In a harrow attachment for plows, the combination with a plow beam, of a rearwardly extending frame detachably connected to said beam, a hanger carried by said frame, a segment-shaped toothed head pivotally mounted in said hanger, a curved arm carried thereby, a rectangular frame carried by the outer end of said arm and connecting by a chain with the forward end of said plow beam, harrow disks revolubly mounted upon said frame, a scraper carried by said frame for each harrow disk, a lever pivotally supported by said frame and having an enlarged toothed end meshing with said toothed head, depending adjustable bolts supported by said rearwardly extending frame, a cross bar carried by said bolts and a spring carried by the cross bar and having the ends thereof mounted in the sides of said lever, substantially as described.

2. In an attachment for plows, the combination with a plow beam, of a rearwardly extending frame carried by said plow beam, a depending hanger carried by said frame, an arm pivotally supported by said hanger, a harrow frame supported by said arm and connecting by a chain with the forward end of said beam, a lever pivotally supported by said rearwardly extending frame and adapted to move said arm, and provided with a pair of laterally extending apertured lugs and an adjustable spring supported by said rearwardly extending frame and having its ends engaging in the apertured lugs of said levers and normally holding said harrow frame in an adjusted position with relation to said plow beam.

3. A harrow attachment for plows comprising a rearwardly extending beam frame, an arm pivotally supported from said frame, said arm capable of being shifted and provided with a toothed head, a harrow frame carried by said arm, a pivoted lever supported from said beam frame and having a toothed lower end engaging with said toothed head and adapted when adjusted to shift the said arm, and a resilient lever adjusting means supported from said beam frame, said means engaging in the lever and adapted when adjusted to shift the lever.

4. A harrow attachment for plows comprising the combination with a plow beam, of a supporting means depending therefrom, an arm pivotally connected with said supporting means and having a toothed head, a harrow frame carried by said arm, a vertically extending lever pivoted to said supporting means and having a toothed lower end engaging with the toothed head for shifting the arm when the lever is adjusted, and a resilient adjusting means for the lever, said adjusting means carried by said supporting means and engaging in said lever.

In testimony whereof I affix my signature in the presence of two witnesses.

CHRISTIAN SCHARDT.

Witnesses:
 MAX H. SROLOVITZ,
 K. H. BUTLER.